United States Patent [19]
Sawaki

[11] Patent Number: 5,898,233
[45] Date of Patent: Apr. 27, 1999

[54] CONTROLLING APPARATUS FOR LOADS

[75] Inventor: Yukichi Sawaki, Aichi-ken, Japan

[73] Assignee: Brother Kogyo Kabushiki Kaisha, Nagoya, Japan

[21] Appl. No.: 08/839,301

[22] Filed: Apr. 18, 1997

[30]   Foreign Application Priority Data

May 10, 1996  [JP]  Japan ................................. 8-116126

[51] Int. Cl.$^6$ ................................................. H02J 1/00
[52] U.S. Cl. ............................ 307/38; 307/41; 358/296
[58] Field of Search ............................. 307/38, 39, 41; 358/296, 300; 355/282, 285, 219, 216, 208, 289, 290; 361/166

[56]        References Cited

U.S. PATENT DOCUMENTS 5,502,546   3/1996   Muto ........................................ 355/208
5,530,556   6/1996   Miura et al. ............................. 358/300
5,691,630  11/1997   Chosa ....................................... 323/267

*Primary Examiner*—Jeffrey Gaffin
*Assistant Examiner*—Jonathan S. Kaplan
*Attorney, Agent, or Firm*—Oliff & Berridge, PLC

[57]           ABSTRACT

A control apparatus controls power supply to a first load which generates a higher counterelectromotive force upon interruption of power supply and a second load which generates a lower counterelectromotive force upon interruption of power supply. The control apparatus includes a CPU of a facsimile machine for example. Before interrupting power supply to the first load, the CPU determines whether or not the second load is under power supply. When the second load is determined to be under power supply, the CPU immediately interrupts power supply to the first load. When the second load is determined not to be under power supply, the CPU first starts power supply to the second load and subsequently interrupts power supply to the first load.

14 Claims, 4 Drawing Sheets

CONTROLLING APPARATUS FOR LOADS

BACKGROUND OF THE INVENTION

1. Field of the Invention:

The present invention relates to a control apparatus for controlling power supply to loads such as different motors of a facsimile machine or laser beam printer for example.

2. Description of the Related Art:

Generally, an electronic apparatus incorporates a DC power supply circuit wherein a commercial AC power supply is rectified, smoothed and chopped for providing DC power supplies of 24 volts and 5 volts, respectively. The DC 24 V power supply is used for driving motors and/or solenoids, whereas the DC 5 V power supply is used for driving a logic circuit and/or light emitting diodes.

With such a power supply circuit, a motor or other load having an inductance generates a counterelectromotive force upon interruption of power supply thereto. If the generated counterelectromotive force is large, a reverse current may pass in the DC power supply circuit to cause abnormal oscillation in the power supply circuit, thereby adversely affecting the stabilized voltage control (chopping) with respect to both of the 24 V and 5 V power supplies.

A conventional solution to the above-described problem is to increase the capacity of the power supply circuit sufficiently for buffering a reverse current. An alternative solution is to provide a diode which prevents passage of a reverse current.

However, the capacity increase of the power supply circuit involves an added cost. Similarly, the provision of the additional diode also results in an increased cost.

SUMMARY OF THE INVENTION

It is, therefore, an object of the present invention is to provide a control apparatus for controlling power supply to loads wherein a reverse current resulting from a counterelectromotive force can be prevented without causing a cost problem.

According to one aspect of the present invention, there is provided a control apparatus for loads which include a first load and a second load, the first load receiving power supply from a DC power source and generating a first counterelectromotive force upon interruption of power supply, the second load receiving power supply from the DC power source and generating a second counterelectromotive force lower than the first counterelectromotive force upon interruption of power supply. The control apparatus includes a power supply controller for controlling power supply to the first and second loads. The power supply controller determines whether or not power is supplied to the second load. Based on this determination the power supply controller immediately interrupts power supply to the first load when it is determined that power is supplied into the second load, or the power supply controller first starts power supply to the second load and subsequently interrupts power supply to the first load when it is determined that the second load is determined not to be supplied with power.

With the control apparatus described above, the second is made to receive power supply whenever power supply to the first load is interrupted. Thus, a reverse current resulting from a counterelectromotive force due to power supply interruption of the first load is canceled by a forward current resulting from power supply to the second load. As a result, by suitably setting the drive current of the second load, it is possible to prevent the power source from suffering a reverse current. Further, since any suitable one of the loads inherently existing in the system may be utilized as the second load, there is no need for increasing the capacity of the power source and/or for providing an additional diode, thereby avoiding a cost increase problem.

Examples of the first load include a motor (particularly a bipolar motor), a solenoid, a solenoid valve and any other load which has a relatively large inductance. If the system incorporates a plurality of such loads, each of them may be similarly controlled with respect to power supply.

Examples of the second load include a motor, a solenoid, a light emitting diode, a resistor and any other load which has a smaller inductance (including zero inductance) than the first load. If the system incorporates a plurality of such loads, each of them may be similarly controlled with respect to power supply. In case where the second load has an inductance, care need be taken to ensure that the inductance of a reverse current would not cause a reverse current in the power source. Further, the second load need be so selected that a reverse current caused by the inductance of the first load upon interruption of power supply thereto will be canceled by the operation of the second load.

According to a preferred embodiment, the power supply control means first starts power supply to the second load, then interrupts power supply to the first load and further subsequently interrupts power supply to the second load when the second load is determined not to be under power supply. Such power supply control is advantageous for avoiding a waste of energy resulting from continued power supply to the second load.

Advantageously, the DC power source may be provided by a DC power supply circuit which has higher voltage output terminals for power supply to the first and second loads, and lower voltage output terminals for power supply to a logic circuit constituting the power supply control means for example. In this case, it is also possible to prevent abnormal operation of the logic circuit which may result from a reverse current in the DC power supply circuit.

The power supply control means may be incorporated in a central processing unit (CPU) of a facsimile machine for example in case where the first and second loads constitute part of the facsimile machine. Alternatively, the power supply control means may be provided in the form of a relay circuit separate from the CPU.

Further, the first load may be a motor of a facsimile machine for feeding a recording paper sheet, whereas the second load may be a cooling fan motor of the facsimile machine. The paper feeding motor is selected as the first load because the inductance of this motor is relatively large. The cooling fan motor is selected as the second load because it may be actuated at any time without hindering the normal operation of the facsimile machine.

According to another aspect of the present invention, there is provided a control apparatus for loads which include a first load and a second load. The first load receives power supply from a DC power source and generates a first counterelectromotive force upon interruption of power supply. The second load receives power supply from the DC power source and generates a second counterelectromotive force lower than the first counterelectromotive force upon interruption of power supply. The control apparatus includes a power supply controller for controlling power supply to the first and second loads. The power supply controller comprises a power supply determination element for determining whether or not the second load is supplied with power.

The power supply controller further comprises a control signal generator for immediately causing interruption of power supply to the first load in response to determination of the power supply determination element that the second load is supplied with power, or the control signal generator first causes start of power supply to the second load and subsequently causes interruption of power supply to the first load in response to determination of the power supply determination element that the second load is not supplied with power.

According to a further aspect of the present invention, there is provided a printing apparatus comprising a receiver for receiving printing data; a recorder for recording the received printing data on a recording paper sheet; and a motor for feeding the recording paper sheet. The feed motor receives power supply from a DC power source and generates a first counterelectromotive force upon interruption of power supply. A cooling fan motor receiving power supply from the DC power source and generates a second counterelectromotive force lower than the first counterelectromotive force upon interruption of power supply. A power supply controller controls power supply to the paper feeding motor and the cooling fan motor. The power supply controller determines whether or not the cooling fan motor is supplied with power. Based on this determination, the power supply controller immediately interrupts power supply to the paper feeding motor when the cooling fan motor is determined to be supplied with power supply, the power, or controller first starts power supply to the cooling fan motor and subsequently interrupts power supply to the paper feeding motor when the cooling fan motor is determined not to be supplied with power.

Other objects, features and advantages of the present invention will be apparent from the detailed description of the embodiment given below with reference to the accompanying drawings.

DETAILED DESCRIPTION OF THE PREFERRED EMBODIMENTS

The preferred embodiment of the present invention will be described below with reference to the accompanying drawings.

Figure 1:
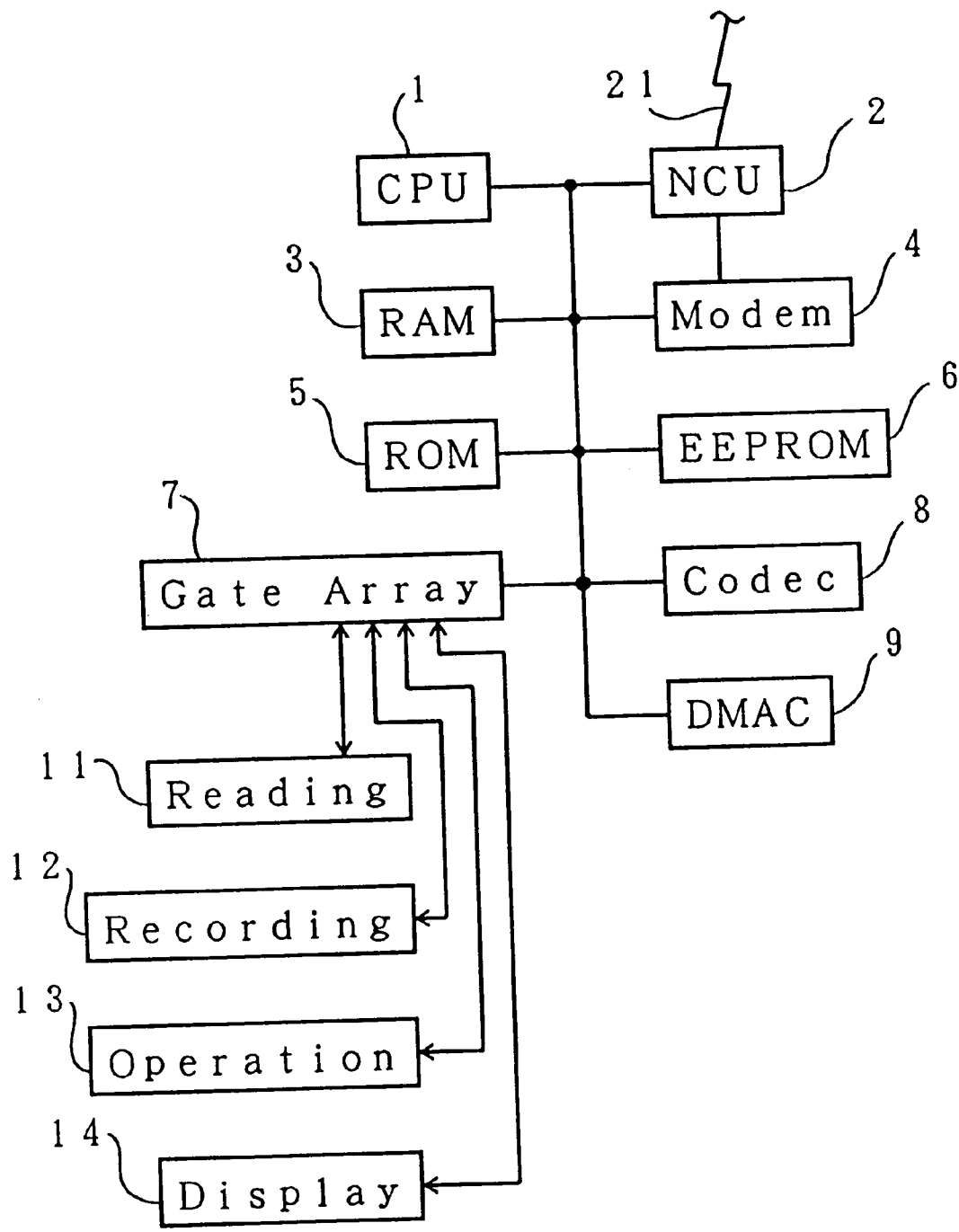
FIG. 1 is a circuit block diagram showing a facsimile machine which incorporates a load control apparatus according to an embodiment of the present invention.

Reference is first made to FIG. 1 which is a circuit block diagram showing a principal portion of a facsimile machine embodying the present invention. This facsimile machine comprises a CPU (central processing unit) 1, an NCU (network control unit) 2, a RAM (random access memory) 3, a modem (modulator-demodulator) 4, a ROM (read-only memory) 5, an EEPROM (electrically erasable and programmable ROM) 6, a gate array 7, a codec (coder-decoder) 8, and a DMAC (direct memory access controller) 9. Further, the facsimile machine also comprises a reading section 11, a recording section 12, an operation section 13, and a display section 14.

The CPU 1, the NCU 2, the RAM 3, the modem 4, the ROM 5, the EEPROM 6, the gate array 7, the codec 8 and the DMAC 9 are connected to each other via bus lines (digital lines) and driven with a DC power source of 5 volts for example. The bus lines include data bus lines, address bus lines and control signal bus lines. The gate array 7 is connected to the reading section 11, the recording section 12, the operation section 13 and the display section 14, respectively.

The CPU 1 provides an overall control of the facsimile machine as a whole.

The NCU 2 is connected to a telephone line 21 for providing network control. The NCU 2 is also connected to the modem 4 through an analog line.

The RAM 3 stores various digital data such as image data. Of course, an additional RAM or RAMs may be provided to increase the capacity of data storage.

The modem 4 modulates the transmitting codes and demodulates the received codes.

The ROM 5 stores various programs or the like as required for controlling the facsimile machine, whereas the EEPROM 6 stores registered data (e.g. shortcut dials) and/or flags.

The gate array 7 functions as a I/O interface (input/output interface) for the CPU 1 for data transmission to and/or from the reading section 11, the recording section 12, the operation section 13 and the display section 14.

The codec 8 performs coding of the transmitting image data and decoding of the received image data.

The DMAC 9 provides memory access control with respect to the RAM 3 for example.

The reading section 11 reads out the image data from an image carrying paper sheet (not shown) for output through the gate array 7, whereas the recording section 12 performs printing of images on a recording paper sheet (not shown) on the basis of the image data received through the gate array 7. As more specifically described hereinafter, the reading section 11 and the recording section 12 have portions driven with a DC power source of 5 volts and other portions driven with a DC power source of 24 volts.

The operation section 13 has key switches to be operated by the user for output of operation signals, whereas the display section 14 includes an LCD or the like for providing various indications under the control of the CPU 1. The operation section 13 and the display section 14 may be equally driven with a DC power source of 5 volts.

Figure 2:
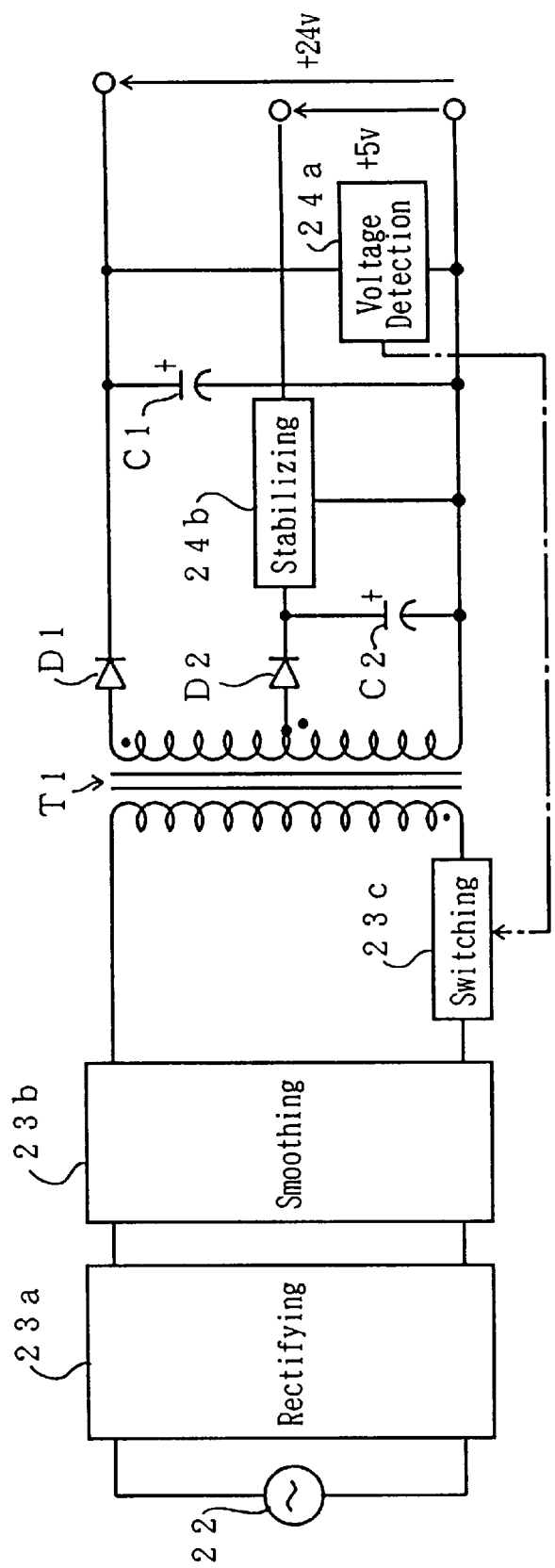
FIG. 2 is a circuit diagram showing a power supply circuit for the facsimile machine illustrated in FIG. 1.

FIG. 2 is a circuit diagram of a power supply circuit to be incorporated in the facsimile machine illustrated in FIG. 1. The power supply circuit includes a rectifying circuit 23a the input side of which is connected to a commercial power source 22. The output side of the rectifying circuit 23a is connected to the input side of a smoothing circuit 23b. One output terminal of the smoothing circuit 23b is connected to the input side of a switching circuit 23c, whereas the other output terminal of the smoothing circuit 23b is connected to the primary winding of a transformer T1 which is also connected to the output side of the switching circuit 23c.

The secondary winding of the transformer T1 has one end connected to the anode of a first diode D1, and the anode of a second diode D2 is connected to an intermediate terminal of the transformer secondary winding. The cathode of the first diode D1 is connected to one terminal of a first capacitor C1, whereas the cathode of the second diode D2 is connected to one terminal of a second capacitor C2. The other end of each of the first and second capacitors C1, C2 is commonly connected to the other end of the transformer secondary winding. The power supply circuit further includes a voltage detection circuit 24a arranged in parallel to the first capacitor C1, and a stabilizing circuit 24b connected to the cathode of the second diode D2 and the other end of the second capacitor C2.

In operation, the commercial power source 22 provides a AC power supply of 100 volts for example. The rectifying circuit 23a makes full-wave rectification of the supplied electric power, whereas the smoothing circuit 23b smoothes the thus rectified power supply. The switching circuit 23 converts the smoothed power supply into a series of adjusted pulses in response to a detection signal from the voltage detection circuit 24a. The transformer T1 converts the thus switched power supply into a transformed power supply suitable for providing voltages of DC 24 volts and DC 5 volts, respectively. Each of the first and second diodes D1, D2 rectifies the transformed power supply, whereas each of the first and second capacitors C1, C2 smoothes the thus rectified power supply. The voltage detection circuit 24a detects the voltage of the DC power supply smoothed by the first capacitor C1 for output of a detection signal to the switching circuit 23c. The stabilizing circuit 24 stabilizes the DC power supply smoothed by the second capacitor C2.

In this way, an output of DC 24 volts is available across the terminals of the first capacitor C1, whereas a supply of DC 5 volts is available at the output side of the stabilizing circuit 24b. In the illustrated embodiment, the first and second capacitors C1, C2 are commonly grounded.

Figure 3:
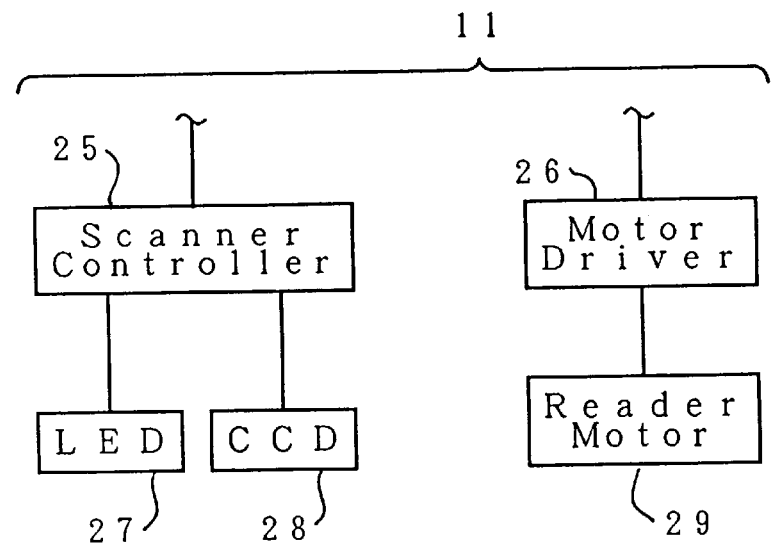
FIG. 3 is a schematic view showing the reading section of the same facsimile machine.

As shown in FIG. 3, the reading section 11 includes an image scanner controller 25 for controlling LEDs (light emitting diodes) 27 and CCDs (charge coupled devices) 28, and a motor driver 26 for controlling a reader motor 29. The LEDs 27 are arranged in an array or arrays and serve as a light source required for image reading. The CCDs 28 are also arranged in an array or arrays for output of analog signals corresponding to the sensed image. The reader motor 29 feeds an image carrying paper sheet in a secondary scanning direction which is perpendicular to a primary scanning direction along the array of CCDs 28.

As previously described, the reading section 11 is connected to the gate array 7 (see FIG. 1). More specifically, the image scanner controller 25 and motor driver 26 of the reading section 11 are connected to the gate array 7 and equally driven with the DC 5 V power supply. The LEDs 27 and the CCDs 28 are also driven with the DC 5 V power supply, whereas the reader motor 29 is actuated with the DC 24 V power supply.

Figure 4:
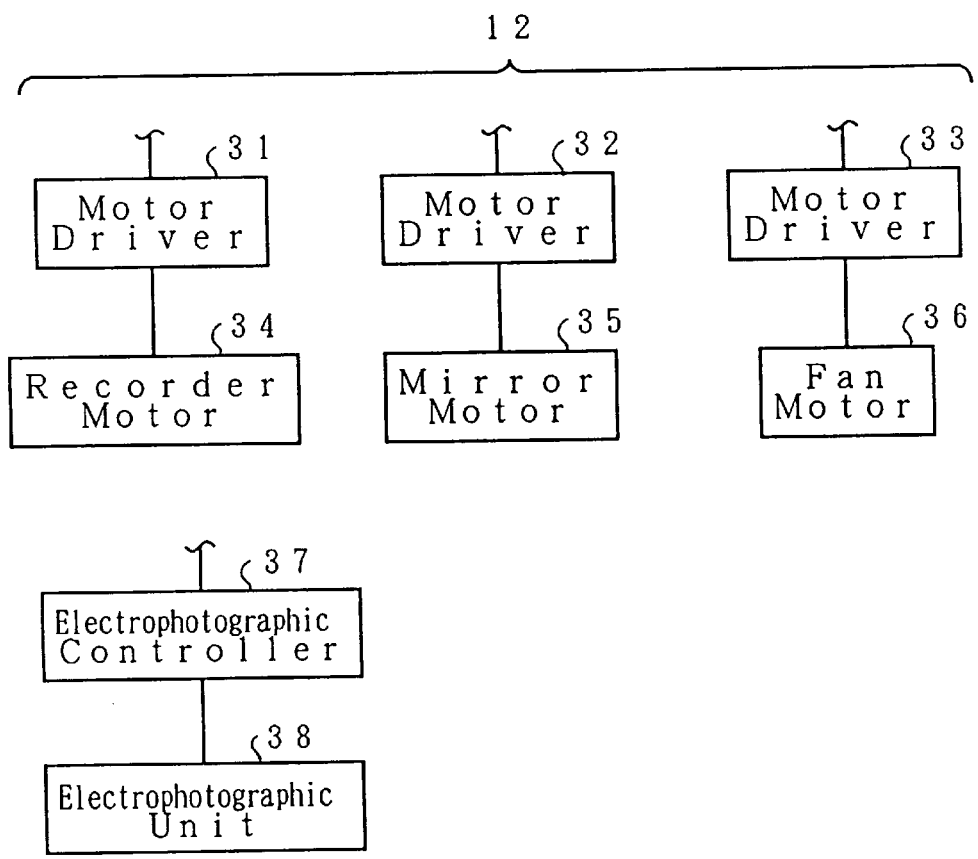
FIG. 4 is a schematic view showing the recording section of the same facsimile machine.

As shown in FIG. 4, the recording section 12 which is a laser beam printer in the illustrated embodiment includes motor drivers 31, 32, 33 for controlling a recorder motor 34, a polygon mirror motor 35 and a fan motor 36, respectively. The recording section 12 also includes an electrophotographic controller 37 for controlling an electrophotographic unit 38.

Like the reader motor 29 of the reading section 11, the recorder motor 34 of the recording unit feeds a recording paper sheet in the secondary scanning direction. The polygon mirror motor 35 serves to rotate a polygon mirror (not shown) for scanning movement of a recording laser beam. The fan motor 36 functions to rotate a fan (not shown) for cooling heated portions of the recording section 12.

Of the three motors 34–36 of the recording section 12, the recorder motor 34 is a bipolar motor which, among the various components of the facsimile machine, has the highest inductance and therefore generates the greatest counter-electromotive force at the time of interrupting power supply to the recorder motor 34. By contrast, the fan motor 36 has a relatively small inductance and therefore does not generate so high a counterelectromotive force as to pass a reverse current through the power supply circuit (FIG. 2) even at the time of interrupting power supply to the fan motor 36.

Though not shown, the electrophotographic unit 38 includes a photosensitive drum, an electrostatically charging device, a developing device, a transcribing device, an image fixing device, and a charge removing device. Thus, the electrophotographic unit 38 records images on the recording paper sheet by electrophotography.

As previously described, the recording section 12 is connected to the gate array 7 (FIG. 1). More specifically, the motor drivers 31–33 and electrophotographic controller 37 of the recording section 12 are connected to the gate array 7 and equally driven with the DC 5 V power supply. The motors 34–36 and the electrophotographic unit 38 are actuated with the DC 24 power supply.

As can be understood from the foregoing description, the recorder motor 34 designed to operate at DC 24 V constitutes a first load which generates a counterelectromotive force at the time of power supply interruption. By contrast, the fan motor 36 also operating at DC 24 V constitutes a second load which generates a lower counterelectromotive force at the time of power supply interruption. The CPU 1 determines the power supply state of the fan motor 36 before interrupting power supply to the recorder motor 34. If the CPU 1 determines that the fan motor 36 is under power supply, the CPU 1 immediately stops power supply to the recorder motor 34. Conversely, if the CPU 1 determines that the fan motor 36 is not under power supply, the CPU 1 interrupts power supply to the recorder motor 36 only after starting power supply to the fan motor 34. Thus, the CPU 1 in the illustrated embodiment serves as a power supply control means which controls power supply to the recorder motor 34 and to the fan motor 36. Further, the DC 5 V power source constitutes a lower voltage power source for the logic circuitry.

Figure 5:
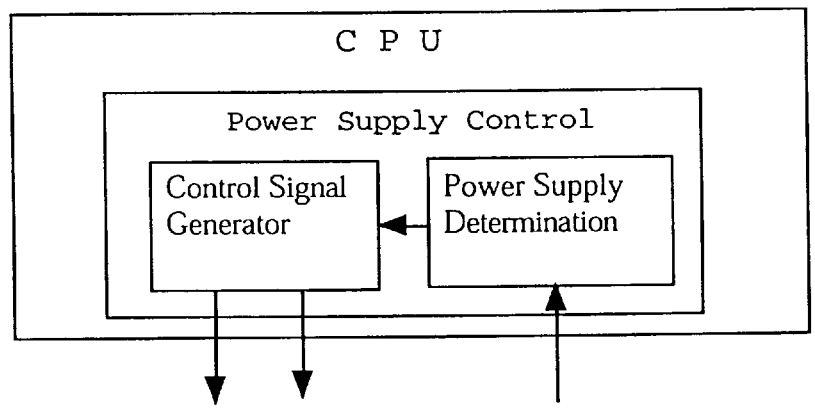
FIG. 5 is a block diagram showing the arrangement of the CPU incorporated in the same facsimile machine.
Figure 6:
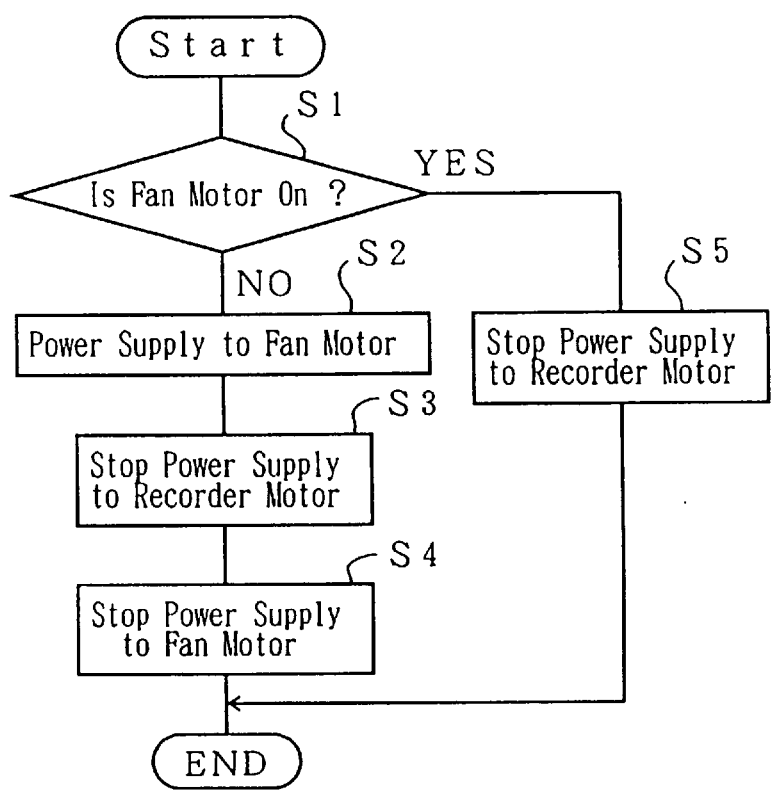
FIG. 6 is a flow diagram showing the steps of controlling power supply to loads in the same facsimile machine.

As shown in FIG. 5, the CPU 1 incorporates a power supply control means 1a for realizing the above-described functions. The power supply control means 1a includes a power supply determination means 1b connected to the motor driver 33 of the fan motor 36 through the gate array 7 (FIG. 1) for determining whether or not the fan motor 36 is under power supply. The power supply control means 1b also includes a control signal generator 1c connected to the respective drivers 31, 33 of the recorder and fan motors 34, 36 through the gate array 7 for feeding a power supply control signal to the respective drivers 31, 33.

The facsimile machine thus designed operates in the following manner.

In the transmission mode, the reading section 11 reads the images of an image carrying paper sheet for output of image data. Then, the image data are coded at the codec 8 and modulated at the modem 4 for transmission through the NCU 2 and the telephone line 21.

In the reception mode, input image data received through the NCU 2 are demodulated at the modem 4 and decoded at the codec 8. Then, the recording section 12 prints out the decoded image data on a recording paper sheet.

In the copy mode, the reading section 11 reads the images of an image carrying paper sheet for output of image data which are transmitted, through the gate array 7, to the recording unit 12 for printing on a recording paper sheet as reproduced images.

In this way, the recording section 12 is actuated in the reception and copy modes. As previously described, the recorder motor 34 of the recording section 12 has a high inductance and therefore generates a large counterelectromotive force at the time of interrupting power supply to the recorder motor 34. According to the illustrated embodiment, the CPU 1 controls interruption of power supply to the recorder motor 34 to prevent a reverse current from passing in the power supply circuit due to such a large counterelectromotive force.

Next, reference is made to FIG. 5 to explain how the CPU 1 controls interruption of power supply to the recorder motor 34.

First, the power supply determination means 1b of the CPU 1 determines whether the fan motor 36 is under power supply or not (Step S1). More specifically, the power supply determination means 1b checks whether drive signals for the fan motor 36 is being supplied to the recording section 12 through the gate array 7.

If the fan motor 36 is found not to be under power supply (NO in Step S1), the control signal generator 1c of the CPU 1 sends a control signal to the motor driver 33 of the recording section 12 via the gate array 7 to start power supply to the fan motor 36 (Step S2).

Then, the control signal generator 1c of the CPU 1 sends another control signal to the motor driver 31 via the gate array 7 to stop power supply to the recorder motor 34 (Step S3). At this time, the recorder motor 34 generates a large counterelectromotive force due to its inductance. However, since a sufficient forward current is passing in the power supply circuit (FIG. 2) due to power supply to the fan motor 36, the counterelectromotive force generated by the recorder motor 34 does not cause a reverse current in the power supply circuit.

Then, the control signal generator 1c of the CPU 1 feeds an additional control signal to the motor driver 33 via the gate array 7 to stop power supply to the fan motor 36 (Step S4). In this step, power supply to the fan motor 36 is interrupted after interruption of power supply to the recorder motor 34 because the previous determination of no power supply to the fan motor 36 in Step S1 indicates that the facsimile machine is in a state not requiring drive of the fan motor 36 for cooling.

On the other hand, if the fan motor 36 is found to be under power supply in Step S1 (YES in Step S1), the control signal generator 1c of the CPU 1 feeds a control signal to the driver 31 through the gate array 7 to immediately stop power supply to the recorder motor 34 (Step S5). This time, again, the interruption of power supply to the recorder motor 34 does not cause a reverse current in the power supply circuit because the fan motor 36 is already in operation. This routine finishes without subsequent interruption of power supply to the fan motor 36 because the previous determination of power supply to the fan motor 36 in Step S1 indicates that the facsimile machine is in a state requiring drive of the fan motor 36 for cooling.

The present invention being thus described, it is obvious that the same may be varied in many ways. Such variations should not be regarded as a departure from the spirit and scope of the present invention, and all such modifications as would be obvious to those skilled in the art are intended to be included within the scope of the following claims.

What is claimed is:

1. A control apparatus for loads which include a first load and a second load, the first load receiving power supply from a DC power source and generating a first counterelectromotive force upon interruption of power supply, the second load receiving power supply from the DC power source and generating a second counterelectromotive force lower than the first counterelectromotive force upon interruption of power supply, the control apparatus comprising:

power supply control means for controlling power supply to the first and second loads, the power supply control means determining whether or not the second load is supplied with power, the power supply control means immediately interrupting power supply to the first load when the second load is determined to be supplied with power, the power supply control means first starting power supply to the second load and subsequently interrupting power supply to the first load when the second load is determined not to be supplied with power.

2. The control apparatus according to claim 1, wherein the power supply control means first starts power supply to the second load, then interrupts power supply to the first load and further subsequently interrupts power supply to the second load when the second load is determined not to be supplied with power.

3. The control apparatus according to claim 1, wherein the DC power source is provided by a DC power supply circuit which has higher voltage output terminals for power supply to the first and second loads, and lower voltage output terminals for power supply to the power supply control means.

4. The control apparatus according to claim 1, wherein the power supply control means is incorporated in a central processing unit.

5. The control apparatus according to claim 1, wherein the power supply control means is incorporated in a central processing unit of a facsimile machine.

6. The control apparatus according to claim 1, wherein the first load comprises a motor for feeding a recording paper sheet.

7. The control apparatus according to claim 1, wherein the second load comprises a cooling fan motor.

8. The control apparatus according to claim 1, wherein the first load comprises a motor for feeding a recording paper sheet, the second load comprising a cooling fan motor.

9. The control apparatus according to claim 1, wherein the first load comprises a motor of a facsimile machine for feeding a recording paper sheet, the second load comprising a cooling fan motor of the facsimile machine.

10. A control apparatus for loads which include a first load and a second load, the first load receiving power supply from a DC power source and generating a first counterelectromotive force upon interruption of power supply, the second load receiving power supply from the DC power source and generating a second counterelectromotive force lower than the first counterelectromotive force upon interruption of power supply, the control apparatus comprising:

power supply control means for controlling power supply to the first and second loads;
    the power supply control means comprising power supply determination means for determining whether or not the second load is supplied with power:
    the power supply control means further comprising a control signal generator for immediately causing interruption of power supply to the first load in response to determination of the power supply determination means that the second load is supplied with power, the control signal generator first causing start of the power supply to the second load and subsequently causing interruption of power supply to the first load in response to determination of the power supply determination means that the second load is not supplied with power.

11. A printing apparatus comprising:

means for receiving printing data;

means for recording the received printing data on a recording paper sheet;

a motor for feeding the recorded paper sheet, the paper feeding motor receiving power supply from a DC power source and generating a first counterelectromotive force upon interruption of power supply;

a cooling fan motor receiving power supply from the DC power source and generating a second counterelectromotive force lower than the first counterelectromotive force upon interruption of power supply; and power supply control means for controlling power supply to the paper feeding motor and the cooling fan motor;

wherein the power supply control means determines whether or not the cooling fan motor is supplied with power, the power supply control means immediately interrupting power supply to the paper feeding motor when the cooling fan motor is determined to be supplied with power, the power supply control means first starting power supply to the cooling fan motor and subsequently power supply to the paper feeding motor when the cooling fan motor is determined not to be supplied with power.

12. The printing apparatus according to claim 11, wherein the power supply control means first starts power supply to the cooling fan motor, then interrupts power supply to the paper feeding motor and further subsequently interrupts power supply to the cooling fan motor when the cooling fan motor is determined not to be supplied with power.

13. The printing apparatus according to claim 11, wherein the DC power source is provided by a DC power supply circuit which has higher voltage output terminals for power supply to the paper feeding motor and the cooling fan motor, and lower voltage output terminals for power supply to the power supply control means.

14. The printing apparatus according to claim 11, wherein the printing apparatus is a facsimile machine, the printing data receiving means receiving the printing data from another facsimile machine.

* * * * *